US012142831B2

(12) United States Patent
Cardona, Jr. et al.

(10) Patent No.: US 12,142,831 B2
(45) Date of Patent: Nov. 12, 2024

(54) DUAL-POLARIZED ANTENNAS

(71) Applicant: ELECTRONIC DESIGN & DEVELOPMENT, CORP., Tucson, AZ (US)

(72) Inventors: Sergio E. Cardona, Jr., Tucson, AZ (US); Kevin W. Patrick, Tucson, AZ (US); Joel Blumke, Tucson, AZ (US)

(73) Assignee: ELECTRONIC DESIGN & DEVELOPMENT, CORP., Tucson, AZ (US)

( * ) Notice: Subject to any disclaimer, the term of this patent is extended or adjusted under 35 U.S.C. 154(b) by 146 days.

(21) Appl. No.: 18/145,674

(22) Filed: Dec. 22, 2022

(65) Prior Publication Data

US 2023/0253715 A1 Aug. 10, 2023

Related U.S. Application Data

(60) Provisional application No. 63/293,989, filed on Dec. 27, 2021.

(51) Int. Cl.
*H01Q 13/10* (2006.01)
*H01Q 9/04* (2006.01)
*H01Q 21/24* (2006.01)

(52) U.S. Cl.
CPC ......... *H01Q 13/106* (2013.01); *H01Q 9/0492* (2013.01); *H01Q 21/24* (2013.01)

(58) Field of Classification Search
None
See application file for complete search history.

(56) References Cited

U.S. PATENT DOCUMENTS 4,122,406 A 10/1978 Salzberg
10,418,679 B2 9/2019 Parekh et al.
2003/0003881 A1 1/2003 Anim-Appiah et al.
(Continued)

FOREIGN PATENT DOCUMENTS

WO 2018051238 A1 3/2018

OTHER PUBLICATIONS

Hui et al. "Numerical and experimental studies of a helical antenna loaded by a dielectric resonator." Radio Science 32.2 (1997): 295-304.

(Continued)

*Primary Examiner* — Wilson Lee
(74) *Attorney, Agent, or Firm* — NGUYEN TARBET IP LAW

(57) ABSTRACT

Waveguide antennas and corresponding manufacturing methods are described herein. These include dual-linear antennas. These dual-linear antennas provide efficient transmission and reception of two radio-frequency signals that may be polarized in orthogonal orientations. The electrically conducting features within the dual-linear antenna are manufactured using standard printed circuit board (PCB) manufacturing technology. The final outer form of the dielectric waveguide antenna may be machined by turning on a lathe or similar mechanical technique, cast in a mold, or injection molded, and the final outer form is accurately aligned and registered to the radio-frequency features of the PCB. The dual-polarized antenna device may include multiple pairs of parallel slot antennas fabricated within a planar printed circuit.

26 Claims, 14 Drawing Sheets

(56) References Cited

U.S. PATENT DOCUMENTS

| | | | | |
|---|---|---|---|---|
| 2011/0001680 | A1 | 1/2011 | Leisten | |
| 2011/0281603 | A1 | 11/2011 | Lastinger et al. | |
| 2012/0188142 | A1 | 7/2012 | Shashi et al. | |
| 2013/0214871 | A1 | 8/2013 | Nakamura et al. | |
| 2015/0048996 | A1 | 2/2015 | Aubert et al. | |
| 2016/0029225 | A1 | 1/2016 | Hu | |
| 2016/0359539 | A1 | 12/2016 | Ashrafi et al. | |
| 2017/0093693 | A1* | 3/2017 | Barzegar | H04B 3/00 |
| 2017/0222334 | A1 | 8/2017 | Shtrom et al. | |
| 2017/0318589 | A1 | 11/2017 | Negus | |
| 2018/0090830 | A1 | 3/2018 | McMichael et al. | |
| 2018/0331720 | A1* | 11/2018 | Adriazola | H04B 3/58 |
| 2019/0103665 | A1 | 4/2019 | Yoo et al. | |
| 2019/0181926 | A1 | 6/2019 | Liang et al. | |
| 2019/0348759 | A1 | 11/2019 | Walker et al. | |
| 2019/0379427 | A1 | 12/2019 | Geekie et al. | |
| 2019/0392694 | A1 | 12/2019 | Funaki et al. | |
| 2021/0159608 | A1* | 5/2021 | Verd | H01Q 9/285 |
| 2021/0167811 | A1* | 6/2021 | Henry | H04B 3/46 |

OTHER PUBLICATIONS

Rousstia et al., "Switched-beam array of dielectric rod antenna with RF-MEMS switch for millimeter-wave applications", Radio Sci., 2015, 50, 177-190.

Black et al., "Breaking Down mmWave Barriers with Holographic Beam Forming", MW Journal, Feb. 2020, vol. 63, No. 2.

Rein, Steve. "Waveguide Primer." Microwaves 101, everythingRF, p. 1-7, Accessed Jan. 12, 2022. https://www.microwaves101.com/encyclopedias/waveguide-primer.

* cited by examiner

DUAL-POLARIZED ANTENNAS

CROSS-REFERENCE TO RELATED APPLICATIONS

This application is a Non-Provisional and claims benefit of U.S. Provisional Application No. 63/293,989 filed Dec. 27, 2021, the specification of which is incorporated herein in its entirety by reference.

FIELD OF THE INVENTION

The present invention relates to antenna elements for transmission and reception of data and to methods for the manufacturing thereof. In particular, the present invention relates to dual-polarized antennas with printed circuit board slot antennas and dielectric polyrods.

BACKGROUND OF THE INVENTION

Antenna elements are crucial components of telecommunication systems, providing the function of radiating and receiving radio frequency energy that encodes data and voice communication. Antenna elements may be constructed in many different configurations utilizing well known methods and materials including metallic wire, dielectric materials, and printed circuit (Printed Circuit Board or PCB).

Antenna elements may be used to efficiently radiate and receive electromagnetic energy into free space, from a system that otherwise generates or confines its electromagnetic energy. An antenna element that radiates electromagnetic energy equally in all spatial directions in three-dimensional space may be deemed an isotropic radiator. By contrast, in certain applications it is advantageous to create an anisotropic radiator, one which may largely confine the radiation to within a narrow beam or region in a specific desired direction. Confinement of the beam within a narrow region of solid angle (beamforming) may be accomplished by configuring the geometry of the antenna element itself, the materials and methods of its construction, as well as by reflective and refractive focusing in the near field of the antenna element.

Wireless communication networks in general, and networking equipment such as is utilized in 5G communications in particular, may demand a ubiquity of antennas to connect one wireless communication station to another (e.g. stations termed Multiple Input Multiple Output, or MIMO), by electromagnetic radiation, through the free space medium. Sophisticated radiating structures may be necessary, structures whose pattern of radiation may be highly configurable in region, direction, polarization, and power level. The creation of these sophisticated radiating structures may require an amalgamation of many individual antennas. The antennas' function may be: to radiate electromagnetic energy efficiently at their design center frequency; and, to radiate in a well-defined direction, within a well-defined extent of solid angular space. In addition to radiating, these antennas likewise may receive radiation with similar properties. Dielectric waveguide antennas may meet said criteria demanded of individual antennas; moreover, they may do so with great economy of power consumed. The term "dielectric waveguide antenna" may describe a rod antenna that may employ a structural dielectric of high relative permittivity, for the purpose of aiding in shaping the antenna's radiation pattern. These structural dielectrics may be organic polymer matrices, and may be amenable to machining, such as drilling, milling, and lathe turning.

Traditional dielectric waveguide antennas are designed to transmit and receive signals with a single polarization. For some applications, it may be advantageous for a dielectric waveguide antenna to have the ability to transmit and receive separate signals which are polarized in orthogonal directions.

BRIEF SUMMARY OF THE INVENTION

It is an objective of the present invention to provide systems, devices, and methods that allow for transmission and reception of orthogonally polarized radio-frequency electromagnetic signals, as specified in the independent claims. Embodiments of the invention are given in the dependent claims. Embodiments of the present invention can be freely combined with each other if they are not mutually exclusive.

In some embodiments, the present invention features dielectric rod antennas. These antennas may have slot antennas formed in printed circuit board (PCB) assemblies such that the slots are oriented orthogonally to the stacked conductive and dielectric layers of the PCB assembly. These slots may each include a monopole probe for excitation and detection of radio-frequency (RF) signals within the slot. Furthermore, each probe may be connected to an RF connector via a feed system including traces and vias inside the PCB assembly.

One of the unique and inventive technical features of the present invention is the quasi-rectangular arrangement of four radiating slots aligned with a single dielectric rod, with each parallel pair of slots fed with a different signal. Without wishing to limit the invention to any theory or mechanism, it is believed that the technical feature of the present invention advantageously provides for each pair of slots to sum together to transmit or receive signals having a different polarization from signals transmitted or received by the other pair of slots. None of the presently known prior references or work has the unique inventive technical feature of the present invention.

Furthermore, the inventive technical feature of the present invention contributed to a surprising result. For example, it is surprising that the two pairs of slots may be independently operated in close proximity to each other without significant interference or undesirable cross-coupling between them. In some embodiments, each slot may include curved or linear "wings" at either end of the slot to provide an appropriate slot length for a given operating frequency (or frequency range) without interfering with adjacent slots and also maintaining a relatively close physical arrangement of the slots, thus providing simultaneous transmission and detection of distinct signals having orthogonal polarizations.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

The features and advantages of the present invention will become apparent from a consideration of the following detailed description presented in connection with the accompanying drawings in which.

DETAILED DESCRIPTION OF THE INVENTION

Figure 1:
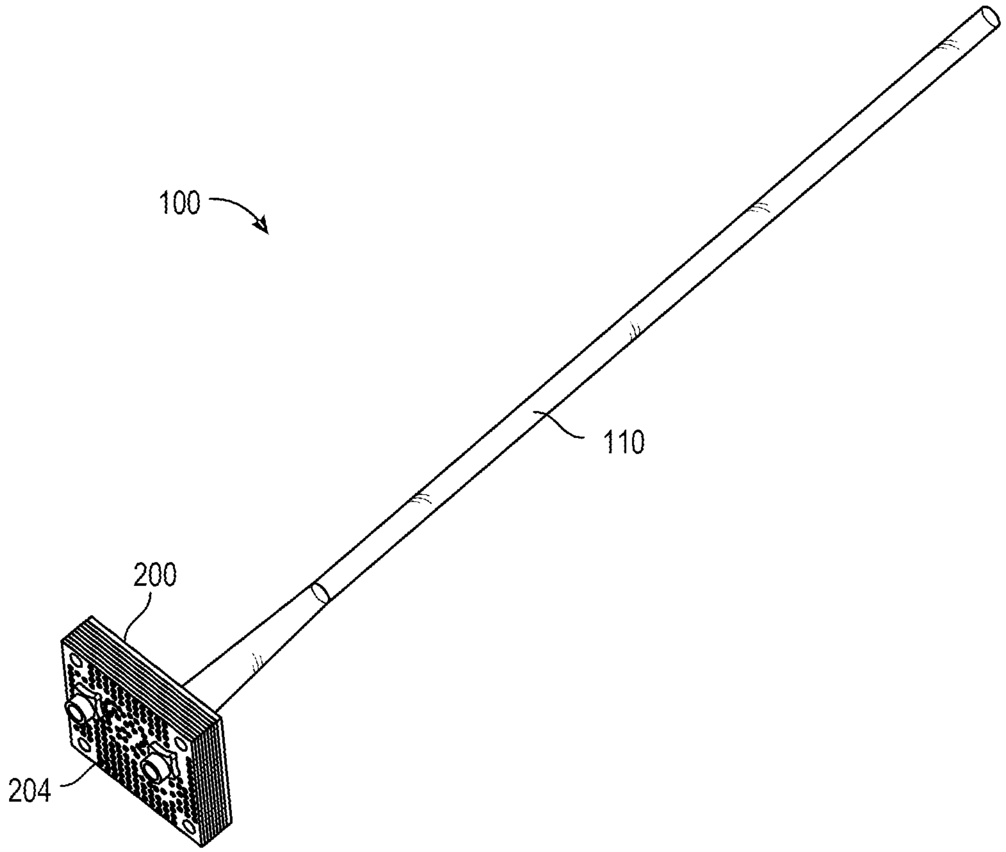
FIG. 1 shows a dual polarized antenna of the present invention, including a printed circuit board (PCB) assembly and a dielectric rod.

Following is a list of elements corresponding to a particular element referred to herein:

100 Dual polarized antenna
110 Dielectric rod
112 First end
114 Second end
116 First segment
118 Second segment
200 Printed circuit board assembly
202 Front face
204 Back face
210 Planar dielectric layer
220 Planar conductive layer
230 First radio frequency (RF) connector
232 Second RF connector
240 First splitter
241 First port
242 Second port
243 Third port
245 Second splitter
246 First port
247 Second port
248 Third port
251 First conductive feed
252 Second conductive feed
253 Third conductive feed
254 Fourth conductive feed
255 Fifth conductive feed
256 Sixth conductive feed
258 Easement gap
260 Radiating aperture
261 First slot 262 Second slot
263 Third slot
264 Fourth slot
265 First pair of slots
266 Second pair of slots
271 First monopole probe
272 Second monopole probe
273 Third monopole probe
274 Fourth monopole probe
270 Dielectric pedestal
272 Central conductive post
274 Conformal conductive post
276 Grid conductive post
278 Mechanical mounting hole Referring now to FIGS. 1-24, in some embodiments, the present invention features a dual-polarized antenna (100). As a non-limiting example, the dual-polarized antenna (100) may include: dielectric rod (110) having a first diameter at a first end (112) and a second diameter at a second end (114); and a printed circuit board (PCB) assembly (200) having a front face (202) and a back face (204). The dielectric rod (110) may include a first segment (116) and a second segment (118). As a non-limiting example, the first segment (116) may be tapered, and the second segment (118) may have a substantially constant diameter. A dielectric constant of the first segment 116 and/or second segment 118 may be selected to have a desired gain, as is known. As a general matter, the lower the dielectric constant of dielectric rod 110 may operate to increase a gain of the antenna. In one example embodiment, the diameter of the second segment 118 of the rod 110 mis approximately one half of the wavelength of the operating frequency of the antenna (inclusive of a range of operating frequencies). In this example embodiment, the length of the taper of the first segment 116 of the rod 110 is approximately 3.8 wavelengths of the operating frequency of the antenna.

The PCB assembly (200) may include: a stacked plurality of planar dielectric layers (210) and a plurality of planar conductive layers (220), stacked between the dielectric layers (210). As a non-limiting example, the PCB assembly (200) may have around 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more conductive layers.

The PCB assembly (200) may also include a first radio-frequency (RF) connector (230) and a second RF connector (232). As a non-limiting example, the first RF connector may correspond to signals polarized in the x-direction and the second RF connector may correspond to signals polarized in the y-direction. In some embodiments, each of the RF connectors may be affixed to the back face (204) of the PCB assembly (200), the front face of the PCB assembly, or one of the side faces of the PCB assembly.

The PCB assembly (200) may also include a first splitter (240) patterned in one of the conductive layers (220), and a second splitter (245) patterned in one of the conductive layers (220). The first splitter (240) may include a first port (241), a second port (242), and a third port (243), where the first port (241) is connected with the first RF connector (230) via a first conductive feed (251). The second splitter (245) may include a first port (246), a second port (247), and a third port (248), where the first port (246) is connected with the second RF connector (232) via a second conductive feed (252). In some embodiments, the first and second splitters may be ring hybrid or RF rat race splitters which allow the signal to be split 180-degrees out of phase. In other embodiments, a splitter such as a Wilkinson splitter may be used to split the signal in phase.

The PCB assembly (200) may also include a plurality of radiating apertures (260) in two or more of the conductive layers (220). In preferred embodiments, the radiating apertures (260) in neighboring conductive layers (220) are aligned to form one or more slots. As a non-limiting example, the radiating apertures (260) in neighboring conductive layers (220) may be aligned to form a first parallel pair of slots (265) and a second parallel pair of slots (266), where the first pair of slots (265) includes a first slot (261) and a second slot (262), the second pair of slots (266) includes a third slot (263) and a fourth slot (264), and the first pair of slots (265) and the second pair of slots (266) are perpendicular to each other. As such, the two pairs of slots may form a quasi-rectangular (e.g. quasi-square) shape when viewed from the front of the PCB assembly.

The PCB assembly (200) may also include a plurality of probes for introducing signals into each of the slots, or detecting signals from each of the slots. As a non-limiting example, the PCB assembly may include a first monopole probe (271) patterned in one of the conductive layers (220) such that it bisects one of the radiating apertures (260) of the first slot (261), a second monopole probe (272) patterned in one of the conductive layers (220) such that it bisects one of the radiating apertures (260) of the second slot (262), a third monopole probe (273) patterned in one of the conductive layers (220) such that it bisects one of the radiating apertures (260) of the third slot (263), and a fourth monopole probe (274) patterned in one of the conductive layers (220) such that it bisects one of the radiating apertures (260) of the fourth slot (264).

Each of the probes may be connected with one of the two splitters. As a non-limiting example, the first monopole probe (271) is connected to the second port (242) of the first splitter (240) via a third conductive feed (253), the second monopole probe (272) is connected to the third port (243) of the first splitter (240) via a fourth conductive feed (254), the third monopole probe (273) is connected to the second port (247) of the first splitter (245) via a fifth conductive feed (255), and the fourth monopole probe (274) is connected to the third port (248) of the first splitter (245) via a sixth conductive feed (256). As such, each pair of parallel slots may be connected to the same splitter.

Figure 4:
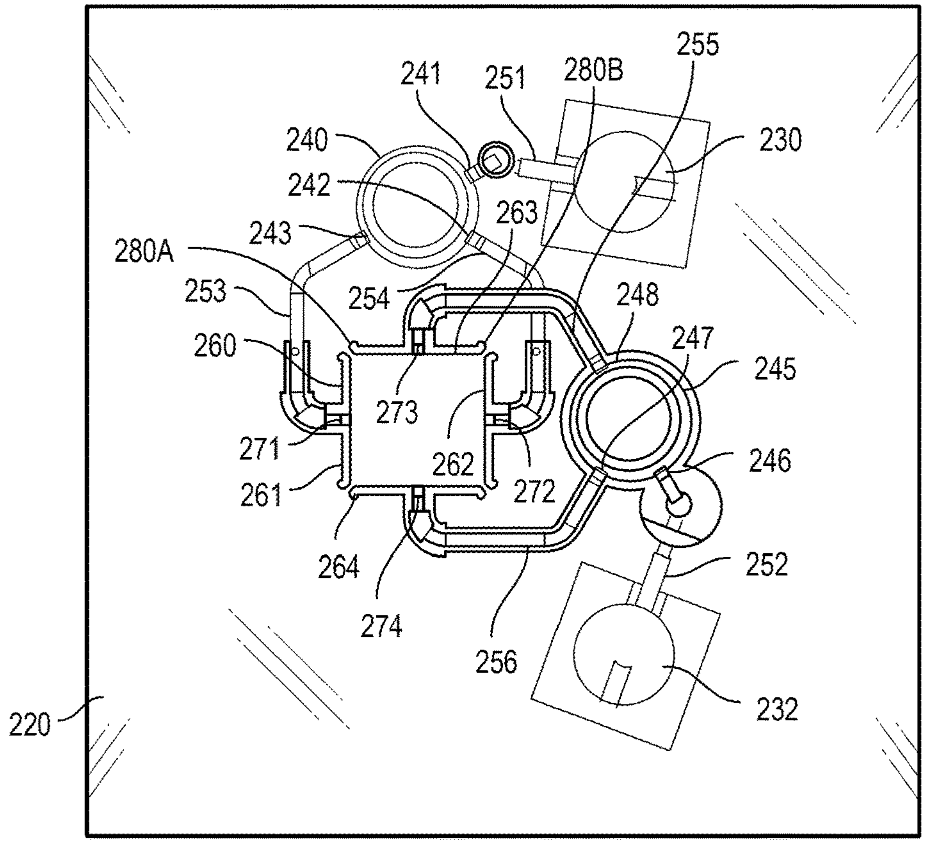
FIG. 4 shows components within the PCB assembly to connect two RF connectors with separate pairs of radiating apertures.
Figure 5:
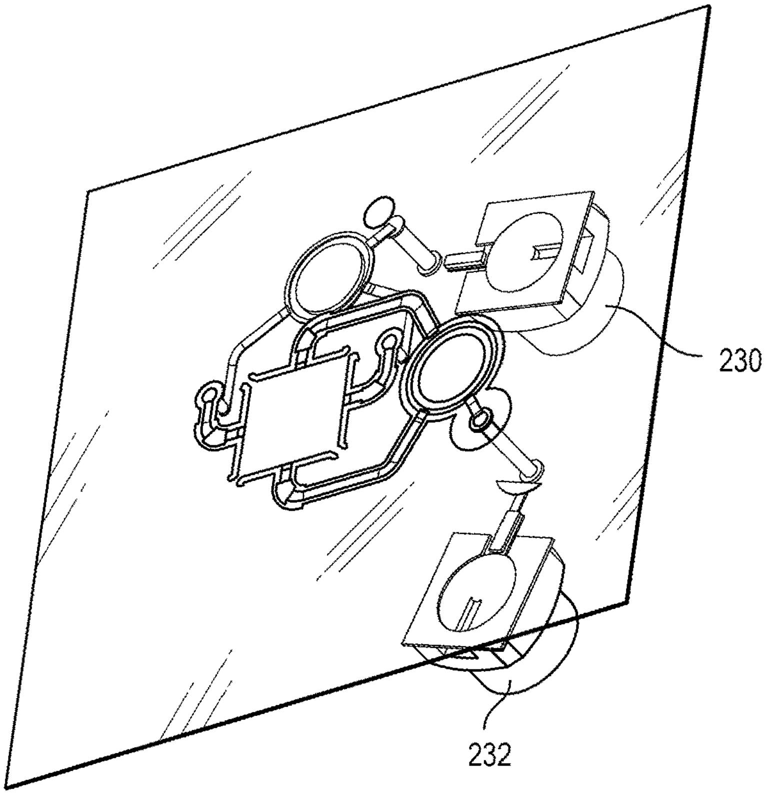
FIG. 5 shows another view of the components within the PCB assembly.
Figure 6:
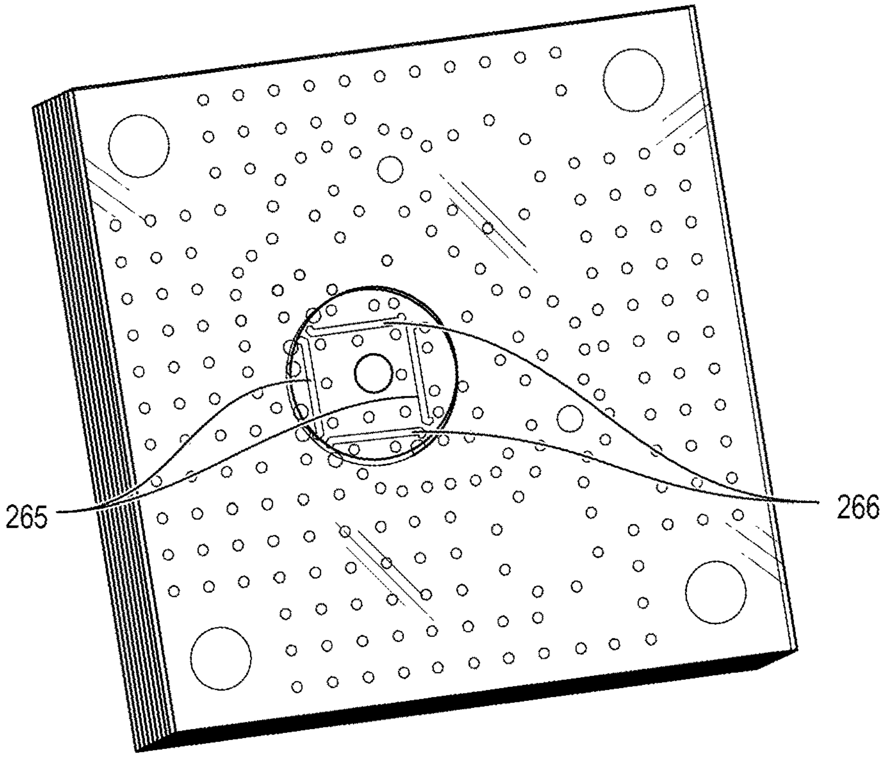
FIG. 6 shows a top view of the PCB assembly with a top dielectric layer rendered as partially transparent.
Figure 7A:
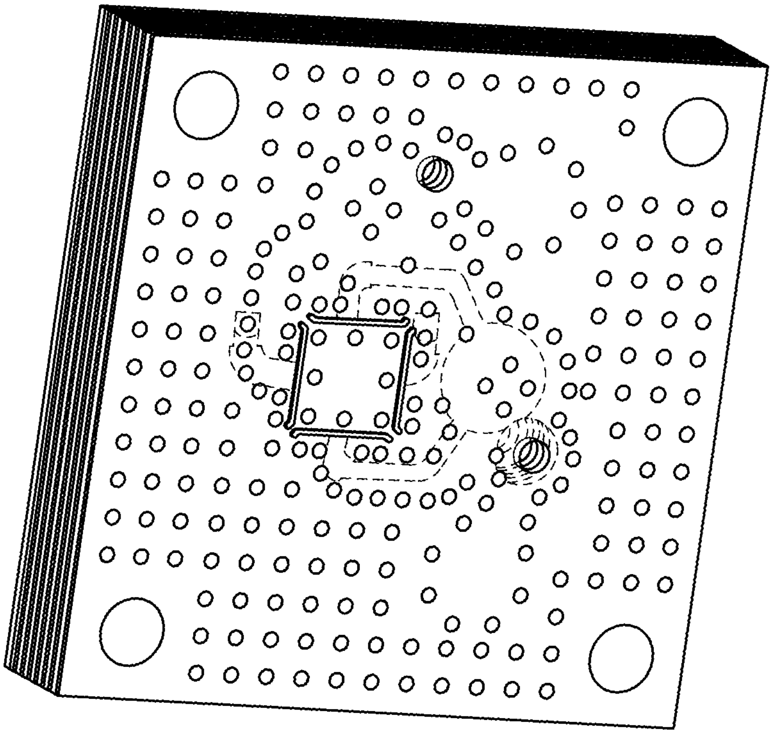
FIG. 7A shows a top view of the PCB assembly with the top dielectric layer removed such that a $1^{st}$ copper layer is revealed.
Figure 7B:
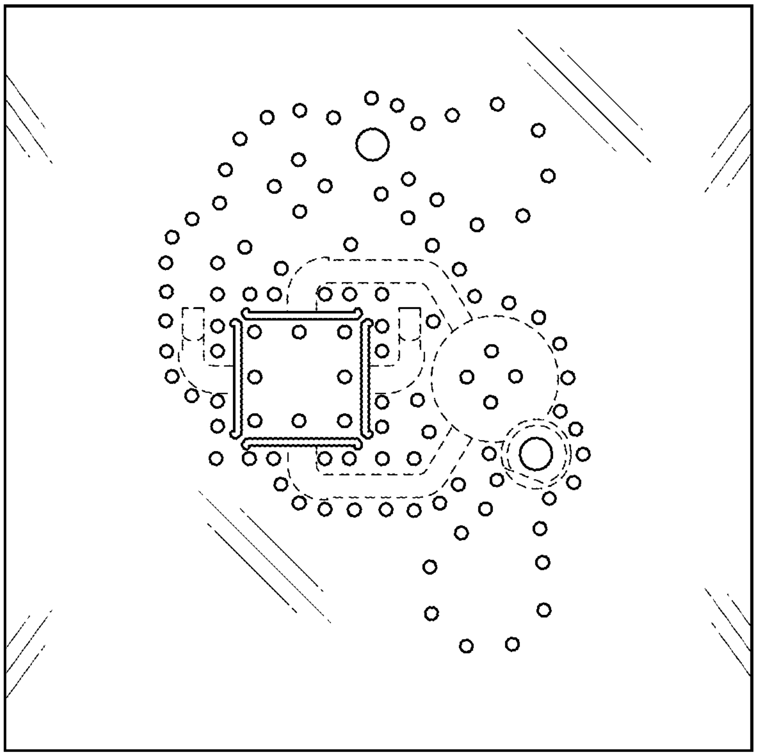
FIG. 7B shows a simplified view of the $1^{st}$ copper layer, with the mounting holds and grid of conductive posts not shown.
Figure 7C:
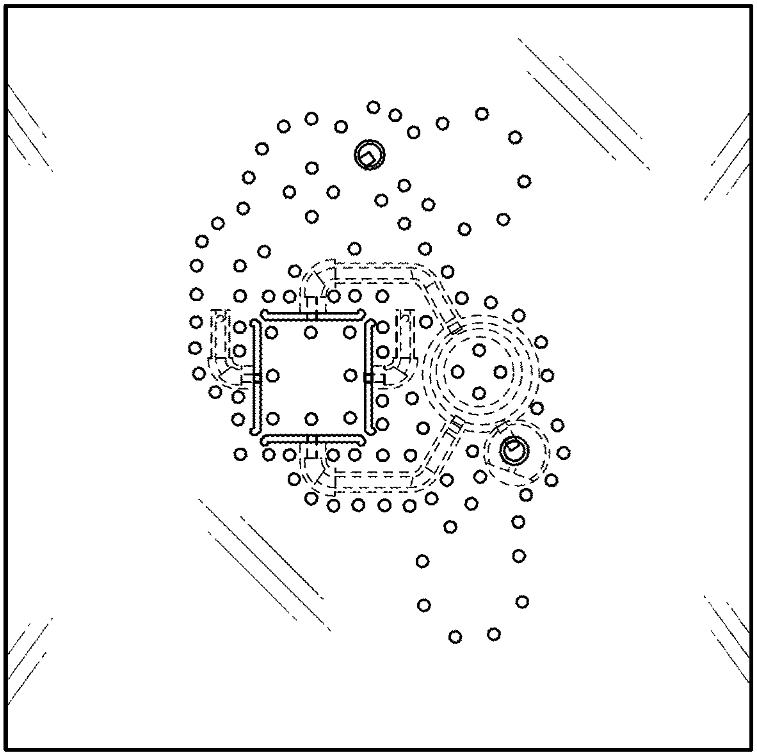
FIG. 7C shows another view of the $1^{st}$ copper layer, with routed traces in lower layers made visible. These traces may serve to inject signal into each of the four slots comprising the stacked radiating apertures.
Figure 8:
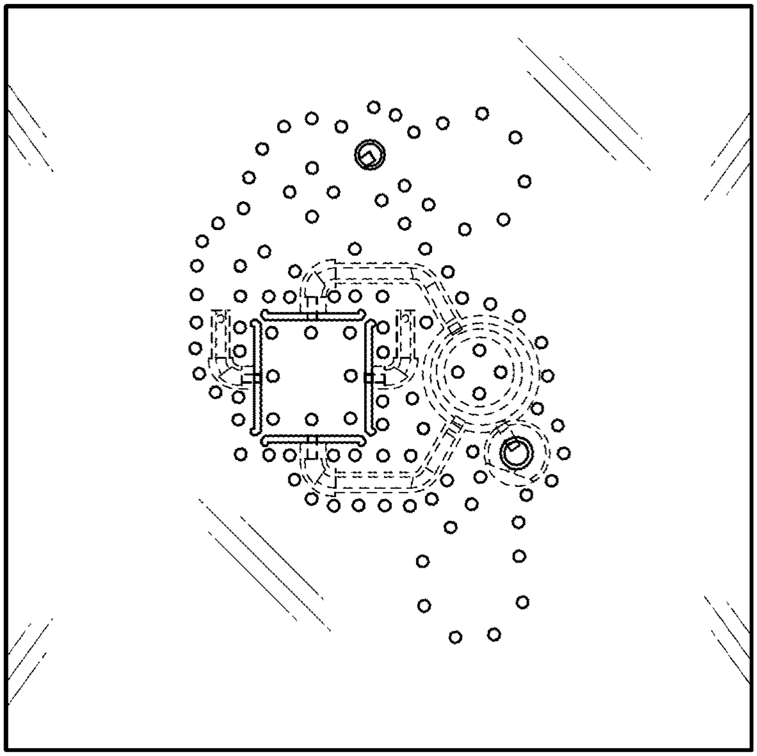
FIG. 8 shows a top view of the PCB assembly with the $1^{st}$ copper layer removed such that a $2^{nd}$ copper layer is revealed, which is identical to the $1^{st}$ copper layer.
Figure 9:
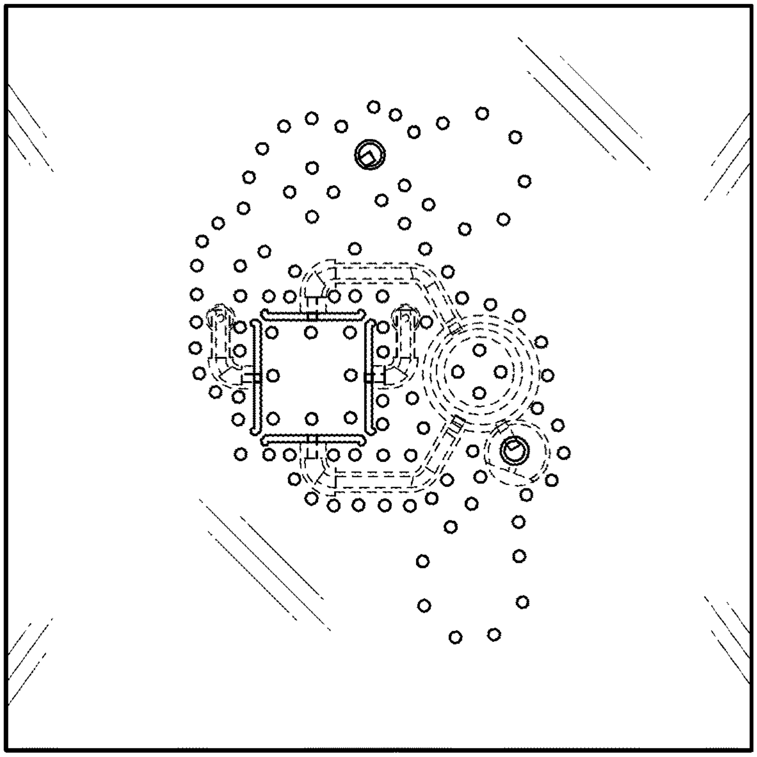
FIG. 9 shows a top view of the PCB assembly with the $1^{st}$ and $2^{nd}$ copper layers removed such that a $3^{rd}$ copper layer is revealed, which is identical to the $2^{nd}$ copper layer.
Figure 10A:
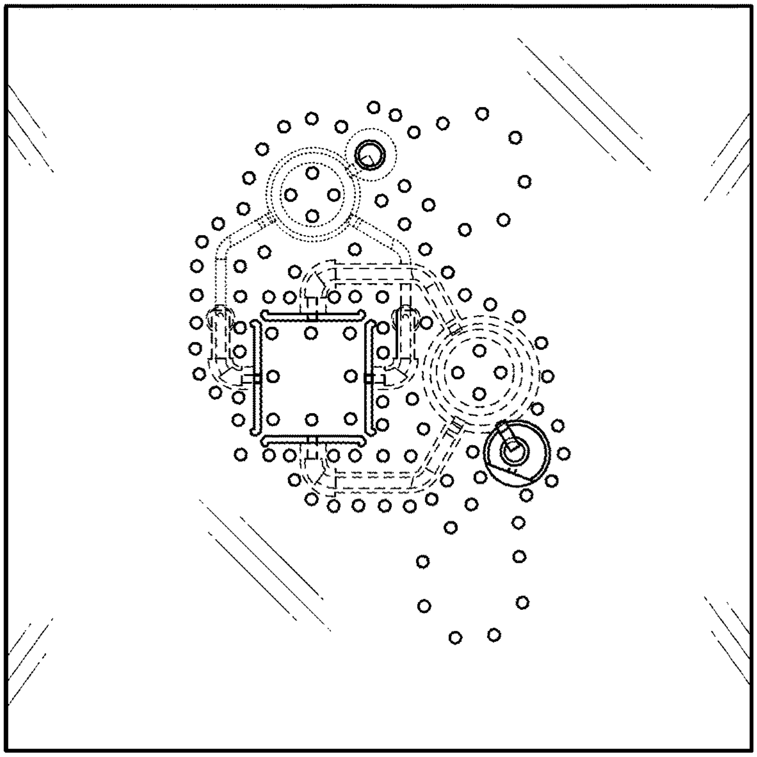
FIG. 10A shows a top view of the PCB assembly with the $1^{st}$, $2^{nd}$, and $3^{rd}$ copper layers removed such that a $4^{th}$ copper layer is revealed, which is nearly identical to the $3^{rd}$ copper layer.
Figure 10B:
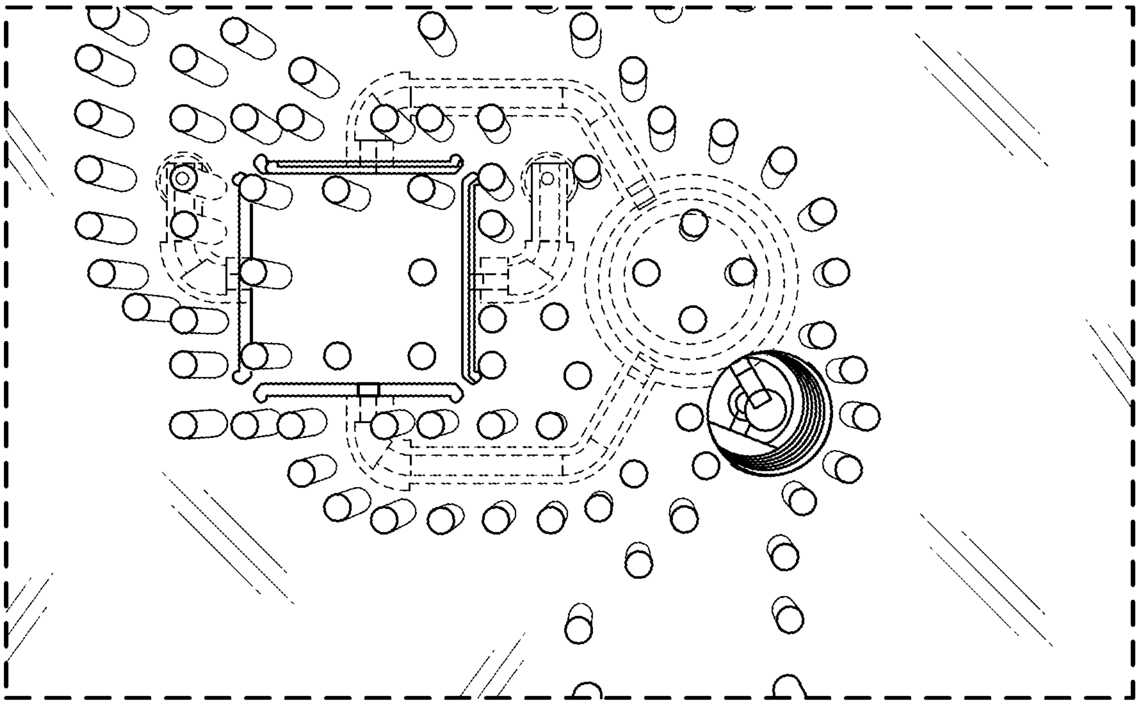
FIG. 10B shows a perspective view of $4^{th}$ copper layer, providing more detail on the enlargement of the hole surrounding the via connecting multiple levels of the traces.
Figure 11:
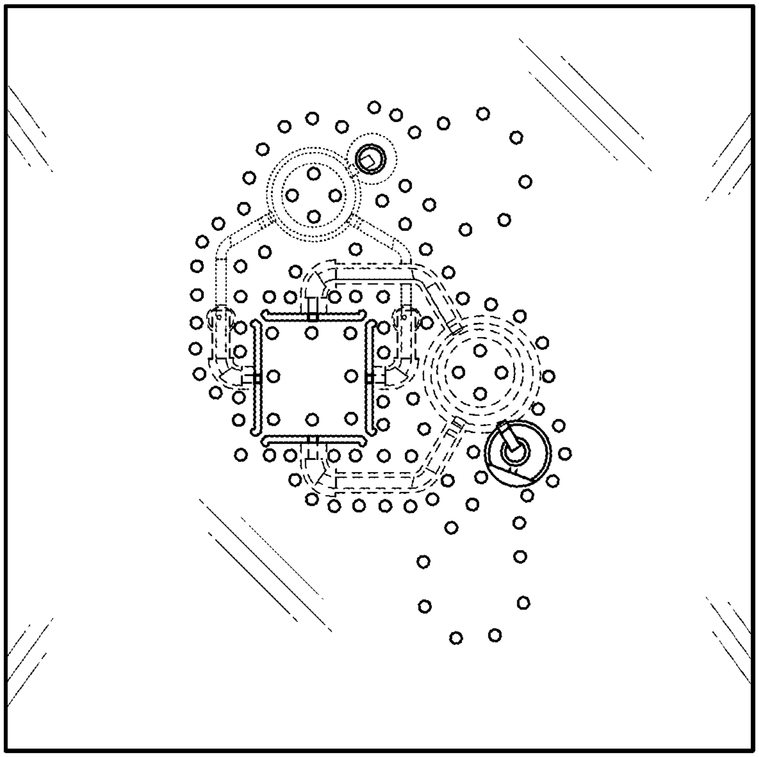
FIG. 11 shows a top view of the PCB assembly with the $1^{st}$-$4^{th}$ copper layers removed such that a $5^{th}$ copper layer is revealed, which is identical to the $4^{th}$ copper layer.
Figure 12A:
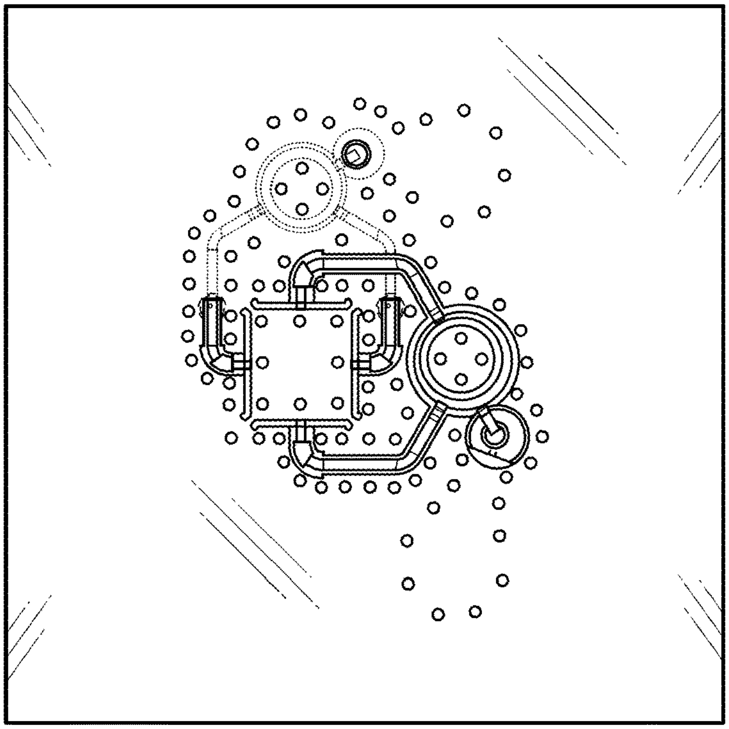
FIG. 12A shows a top view of the PCB assembly with the $1^{st}$-$5^{th}$ copper layers removed such that a $6^{th}$ copper layer is revealed. This layer includes traces to each of the four radiating apertures.
Figure 12B:
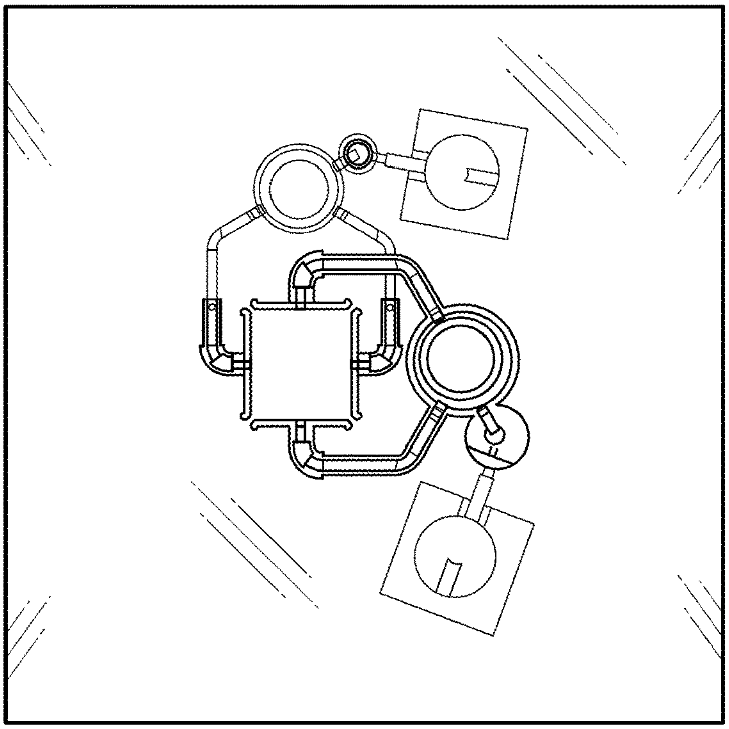
FIG. 12B shows another view of the $6^{th}$ copper layer, with the conformal conductive posts not shown. Easements can be seen around the traces.
Figure 13:
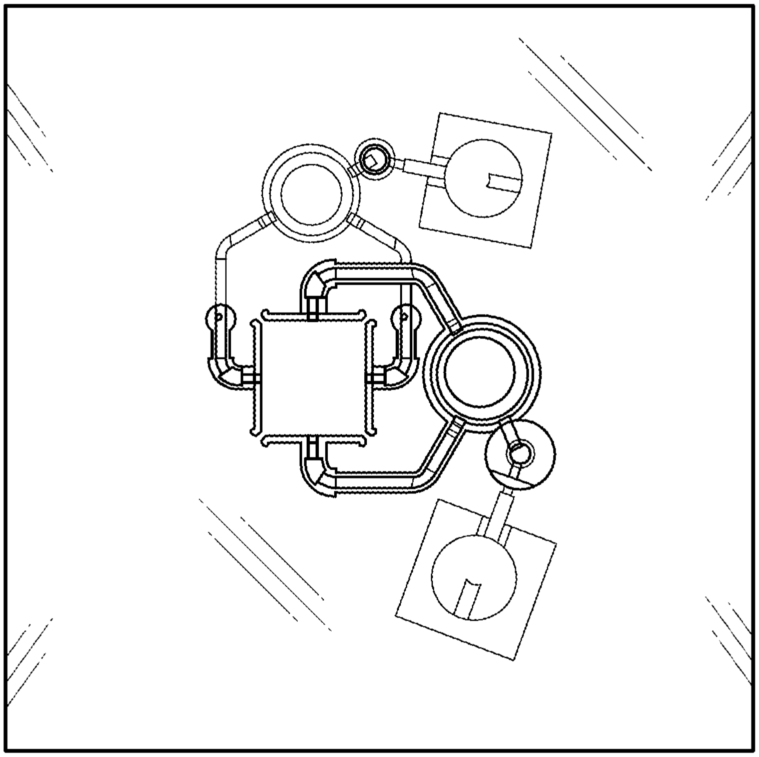
FIG. 13 shows a top view of the PCB assembly with the $1^{st}$-$6^{th}$ copper layers removed such that a $7^{th}$ copper layer is revealed. In this layer, the traces feed into the first and second pairs of radiating apertures. This layer also includes a first ring hybrid RF rat race to split the feed from the first RF connector into two signals, 180 degrees out of phase, which are respectively connected to opposite sides of the first pair of radiating apertures.
Figure 14:
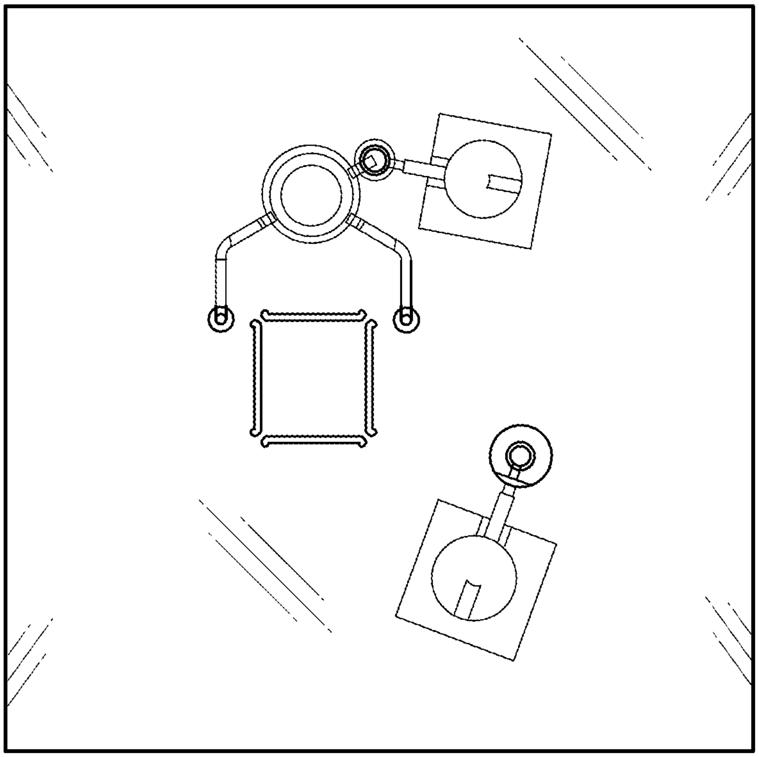
FIG. 14 shows a top view of the PCB assembly with the $1^{st}$-$7^{th}$ copper layers removed such that a $8^{th}$ copper layer is revealed.
Figure 15:
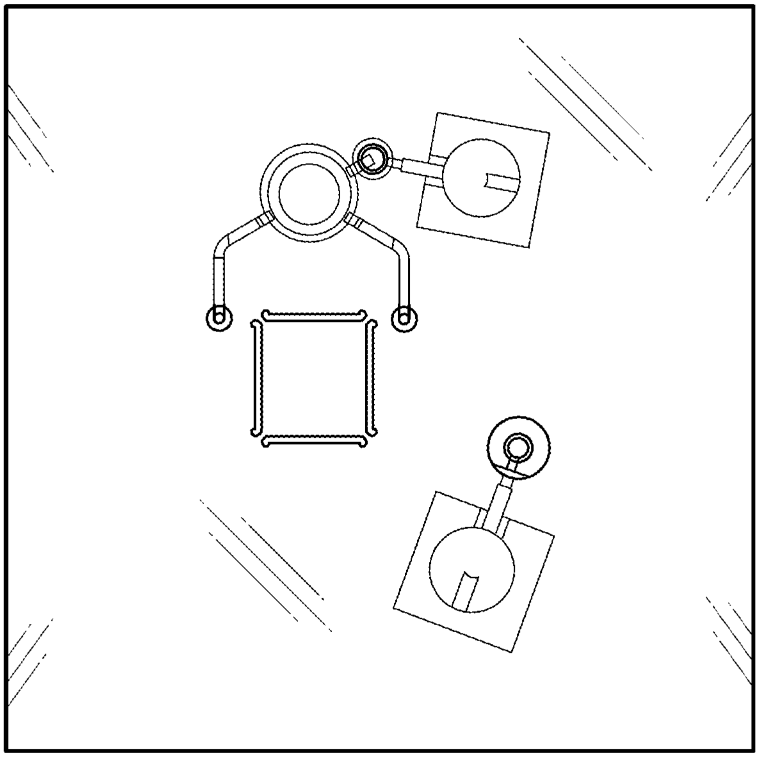
FIG. 15 shows a top view of the PCB assembly with the $1^{st}$-$8^{th}$ copper layers removed such that a $9^{th}$ copper layer is revealed.
Figure 16:
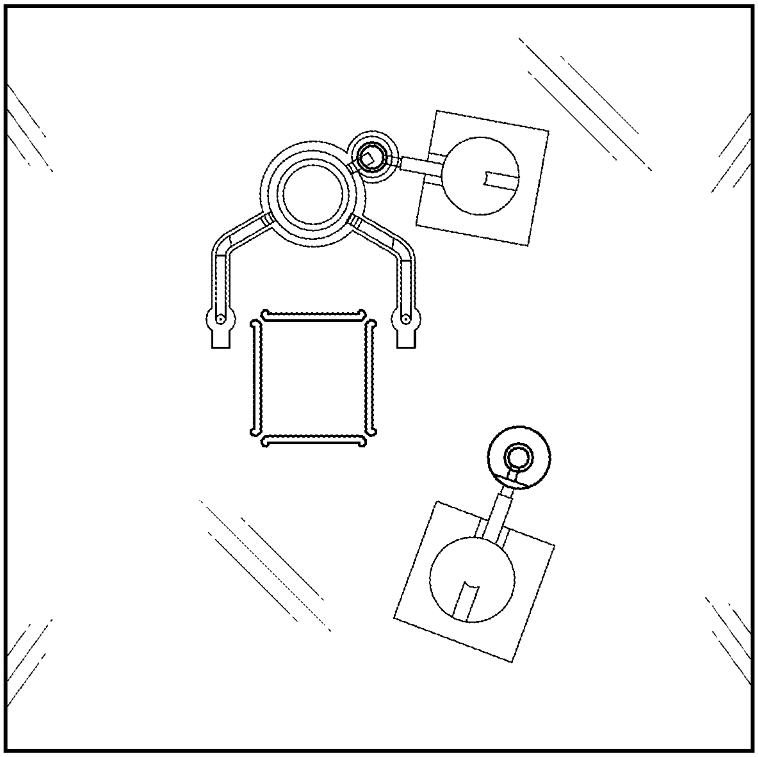
FIG. 16 shows a top view of the PCB assembly with the $1^{st}$-$9^{th}$ copper layers removed such that a $10^{th}$ copper layer is revealed. This layer also includes a second ring hybrid RF rat race to split the feed from the second RF connector into two signals, 180 degrees out of phase, which are respectively connected to opposite sides of the second pair of radiating apertures.
Figure 17:
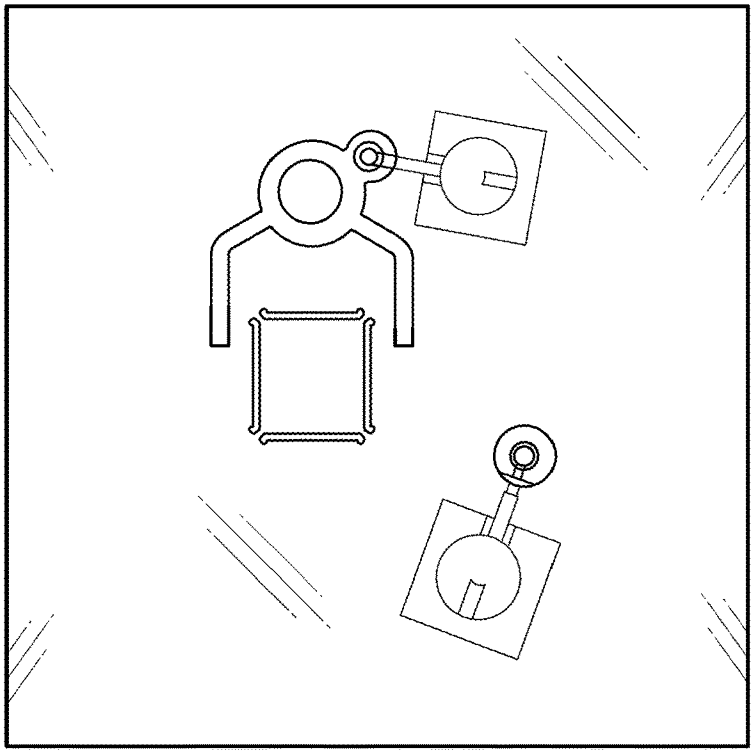
FIG. 17 shows a top view of the PCB assembly with the $1^{st}$-$10^{th}$ copper layers removed such that a $11^{th}$ copper layer is revealed.
Figure 18:
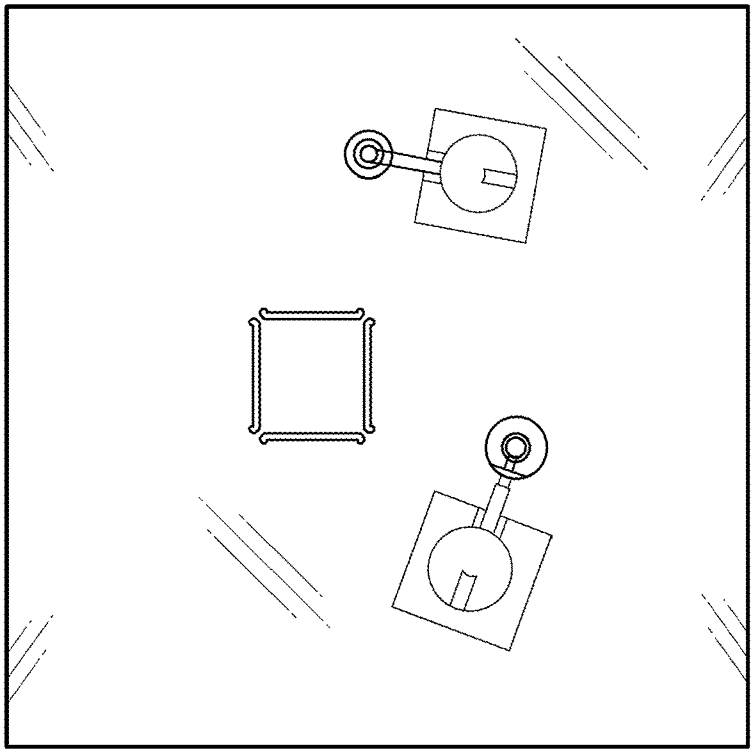
FIG. 18 shows a top view of the PCB assembly with the $1^{st}$-$11^{th}$ copper layers removed such that a $12^{th}$ copper layer is revealed.
Figure 19:
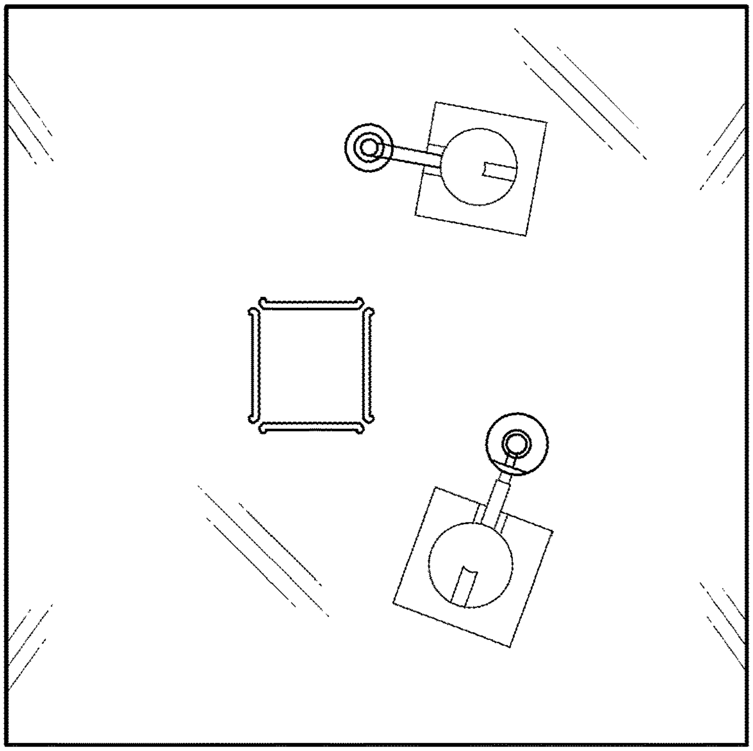
FIG. 19 shows a top view of the PCB assembly with the $1^{st}$-$12^{th}$ copper layers removed such that a $13^{th}$ copper layer is revealed.
Figure 20:
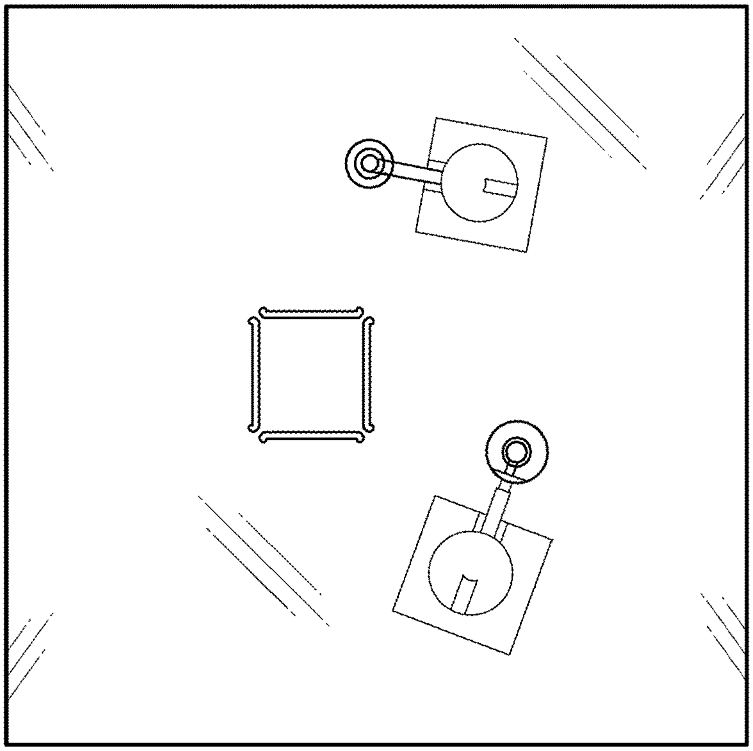
FIG. 20 shows a top view of the PCB assembly with the $1^{st}$-$13^{th}$ copper layers removed such that a $14^{th}$ copper layer is revealed.
Figure 21:
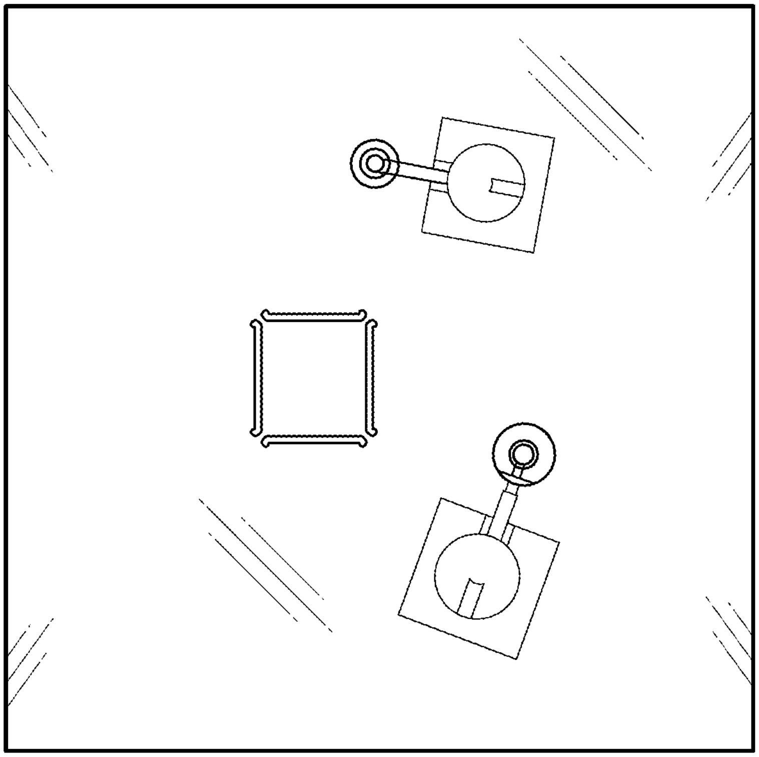
FIG. 21 shows a top view of the PCB assembly with the $1^{st}$-$14^{th}$ copper layers removed such that a $15^{th}$ copper layer is revealed.
Figure 22:
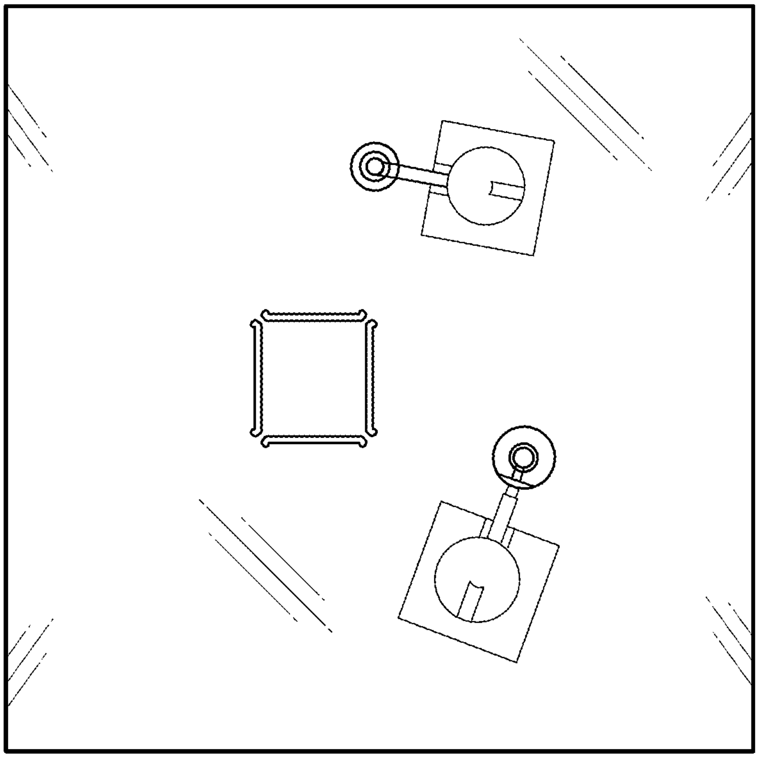
FIG. 22 shows a top view of the PCB assembly with the $1^{st}$-$15^{th}$ copper layers removed such that a $16^{th}$ copper layer is revealed.
Figure 23:
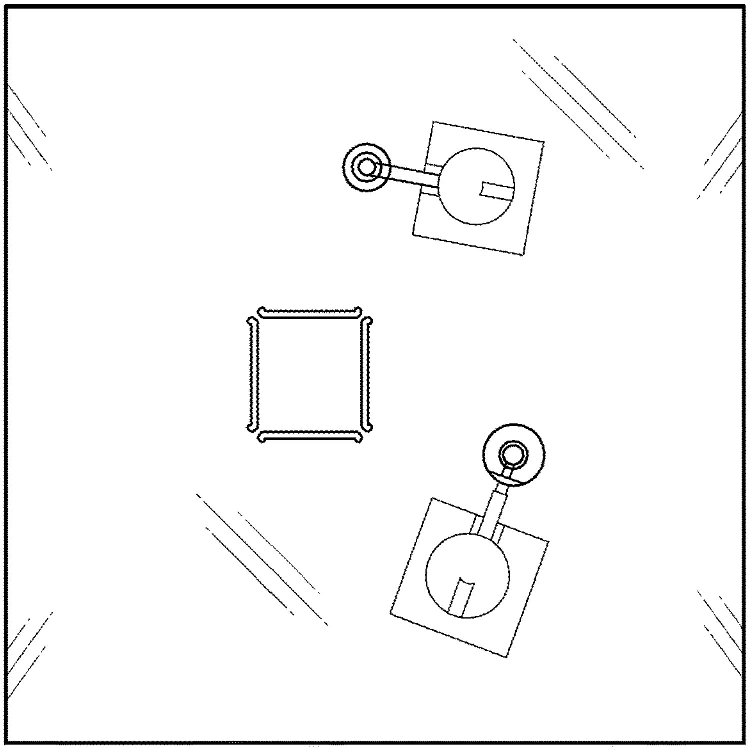
FIG. 23 shows a top view of the PCB assembly with the $1^{st}$-$16^{th}$ copper layers removed such that a $17^{th}$ copper layer is revealed.
Figure 24:
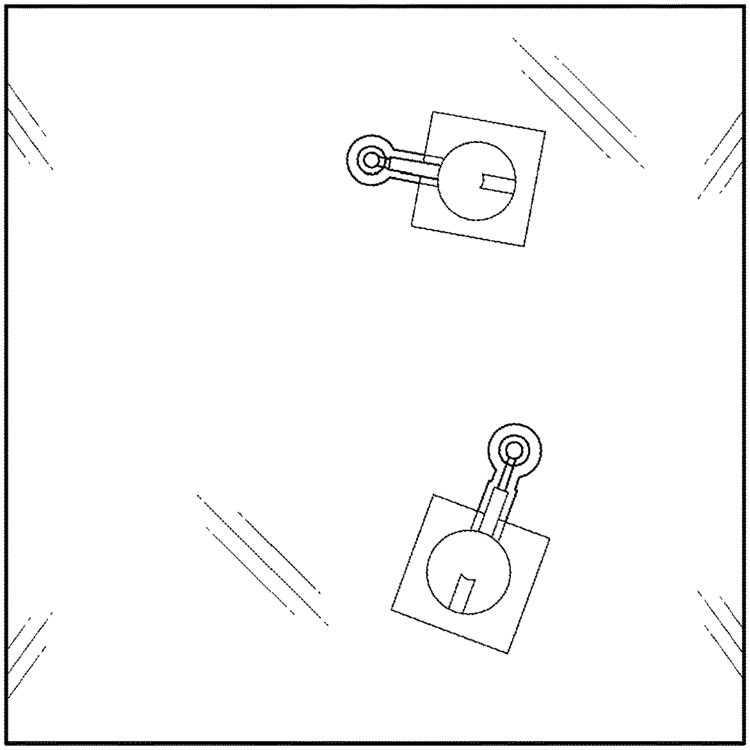
FIG. 24 shows a top view of the PCB assembly with the $1^{st}$-$17^{th}$ copper layers removed such that a $18^{th}$ copper layer is revealed.

The slots 261, 262, 263, and 264 (radiating apertures) generally have a width and length that is based on the operating frequency of the antenna, and is generally dimensions to have length that is approximately ½ wavelength long. In some embodiments, as best illustrated in FIG. 4, and using slot 263 as an example, each slot 261, 262, 263, and 264 may also include extension portions 280A and 280B ("wings") formed on either side of the slot 263. As illustrated, the extension portions 280A and 280B generally extend away from a geometric center of the slots 261, 262, 263, and 264, thus providing control over the length of the slot without interfering with neighboring slots. Such extensions 280A and 280B may include curved sections and/or generally straight sections. The extensions 280A and 280B also enable selection of different operating frequencies while maintaining the same radiating footprint provided by the slots. Each of the slots 261, 262, and 264 may include extensions similar to those illustrated for slot 263. It should be noted that although the Figures illustrate the slots 261, 262, 263, and 264 as generally straight apertures, in other embodiments the slots 261, 262, 263, and 264 may be curved (for example, a U-shaped curve centered around each respective probe) and/or other geometric shapes such as V-shaped, W-shaped, semi-circular-shaped, etc. . . .

Figure 2:
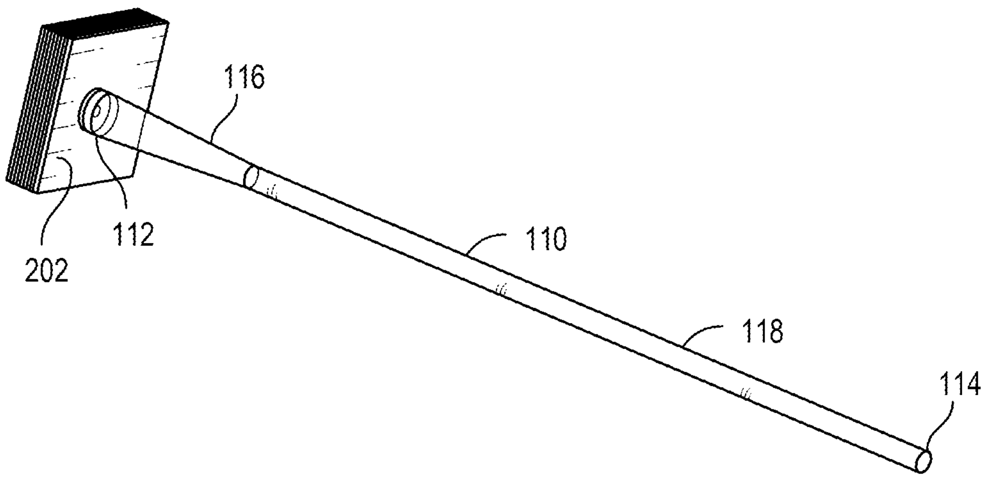
FIG. 2 shows another view of a dual polarized antenna of the present invention.
Figure 3:
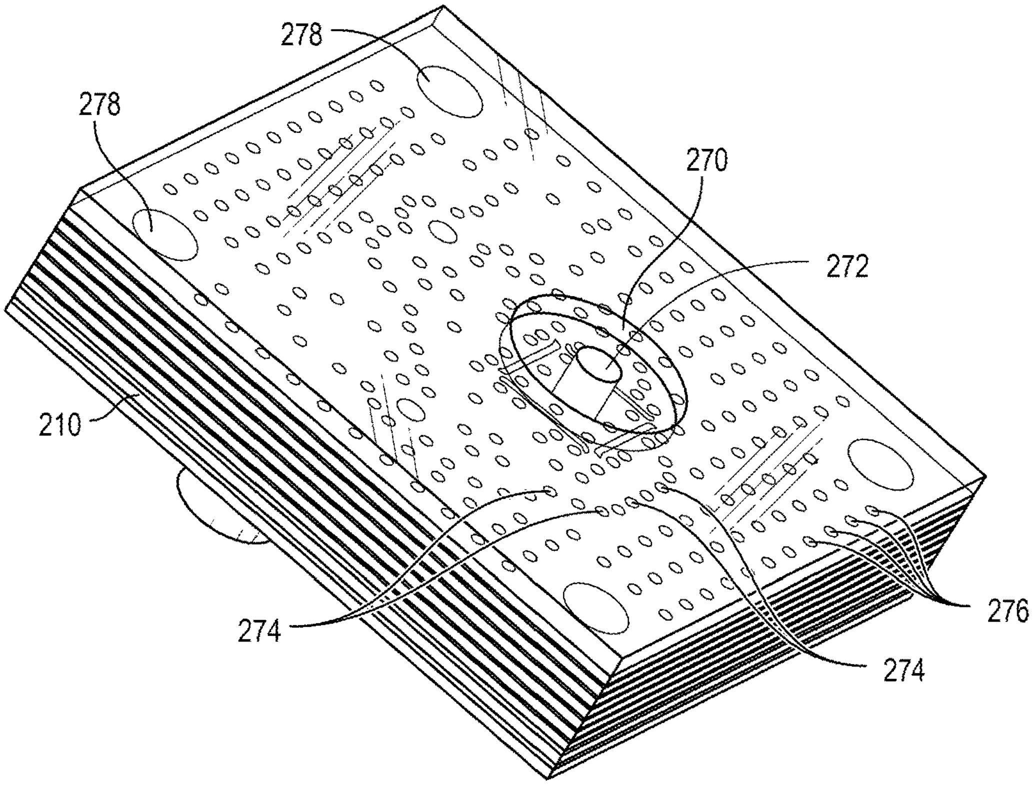
FIG. 3 shows an illustration of a PCB assembly with a cylindrical pedestal on which a dielectric rod may be positioned.

The PCB assembly (200) may also include a dielectric pedestal (270) extending from the front face of the PCB assembly, wherein the first pair of slots (265) and the second pair of slots (266) are arranged to form a quasi-rectangular shape which, in some embodiments, the slots 265/266 are circumscribed by the pedestal (270). The pedestal 270 is generally provided as a mounting surface for the dielectric rod 110. For example, as best seen in FIG. 2, the first segment 116 of the dielectric rod 110 may include a mating recess at the base thereof to mate with the pedestal 270. Of course, in other embodiments, the geometry of the pedestal 270 may include rectangular, spherical and/or irregular shapes (and accordingly, the mating recess of the first segment 116 may have a similar complimentary shape). The dielectric rod 110 may be mounted to the pedestal 270 using, for example, glue and/or adhesive and/or other known mechanical fasters. The dimensions of the pedestal 270 may be selected based on the operating frequency of the antenna. As a general matter, in some embodiments, the diameter of the pedestal 270 is inversely proportional to the operating frequency of the antenna, and thus the diameter of the pedestal 270 may be smaller for greater operating frequencies than the diameter of the pedestal 270 at lower operating frequencies. As illustrated, the pedestal 270 may be generally dimensioned to fully surround (cover) the slots 261, 262, 263, and 264, thus providing consistent dielectric for the radiating apertures. As will be appreciated, the dimensions (e.g., diameter and height) of the pedestal 270 may be derived using conventional and/or proprietary antenna design software tools (using, for example, Ansys HFSS simulation software, etc.), and such dimensions will be generally based on operating frequencies, dielectric constants, and/or other known antenna design variables, with a design goal of providing a dual polarized antenna as described herein. In one example embodiment, the diameter of the pedestal 270 is about a wavelength of the operating frequency (and/or inclusive of an operating frequency range).

According to preferred embodiments the first end (112) of the dielectric rod (110) may be affixed to the dielectric pedestal (270) such that the dielectric rod (110) and the dielectric pedestal (270) are concentric. According to other embodiments, the PCB assembly may lack a dielectric pedestal, and the first end of the dielectric rod may be affixed directly to the front face of the PCB assembly.

The PCB assembly (200) may include one or more central conductive posts (272) which pass through the pedestal (270) to the back face (204) of the PCB assembly (200) such that the one or more centra conductive posts surrounded by the four slots. In some preferred embodiments, the central conductive posts 272 extend past the ends of the radiating surface of the slots, for example, so that the post(s) 272 is disposed within the radiating field of the antenna. The central conductive post 272 is illustrated having a generally circular cross section. However, in some embodiments the post 272 may be formed having a generally rectangular cross section, or irregular cross section. The post 272 is generally provided to provide electromagnetic isolation between the slots 261, 262, 263, and 264. Thus, the overall height of the post 272 (relative to the top surface of the slots 261, 262, 263, and 264) may be selected to provide isolation of the slots 261, 262, 263, and 264, based on the operating frequency of the antenna and the dielectic of the post. In addition, the diameter of the post 272 may be selected to provide isolation of the slots 261, 262, 263, and 264, based on the operating frequency of the antenna. While the diameter and height of the post 272 are selected for isolation of the slots slots 261, 262, 263, and 264, it will be understood that the diameter and height of the post may also be selected to prevent electromagnetic interference of the slots 261, 262, 263, and 264, based on the operating frequency of the antenna. As will be appreciated, the dimensions (e.g., diameter and height) of the post 272 may be derived using conventional and/or proprietary antenna design software tools (e.g., and such dimensions will be generally based on operating frequencies, dielectric constants, and/or other known antenna design variables, with a design goal of providing sufficient isolation without causing interference of the operation of the dual polarized antenna as described herein

EXAMPLE

The following is a non-limiting example of the present invention. It is to be understood that said example is not intended to limit the present invention in any way. Equivalents or substitutes are within the scope of the present invention.

With reference to FIGS. 1-24, the dual linear antenna 100 of this example comprises a rectangular printed circuit board (PCB) assembly 200, two coaxial feed connectors, and a dielectric rod 110. (As used here, 'dielectric' refers to rigid dielectric materials, as opposed to free space.) The dielectric rod 110 aligns with the +z-axis of the local body-aligned coordinate system, and, by refraction, guides and focuses the emission of electromagnetic (EM) wave energy foremost along the +z-axis. Each of the coaxial feed connectors responds separately to EM radiation polarized x-direction and y-direction, respectively. Hence, a linear combination of signals at the two coaxial feed connectors is able to transmit all possible EM wave polarizations foremost in the +z-direction, i.e., linearly polarized along any vector in the xy-plane, in addition to circularly polarized in the x-y plane of either of left-handed or right-handed orientation, and to any elliptical polarization in the x-y plane of either left-handed or right-handed orientation.

Because the dual linear antenna is a reciprocal network, any statements about it regarding the transmission of EM waves imply an equivalent statement regarding the reception of EM waves.

Since any discussion of antennas and distributed circuits involves resonances of the antenna's and circuit's physical dimensions with the wavelengths of wave phenomena, in order to discuss this example embodiment in a meaningful fashion, the following parameters of its design may be used:

The speed of light in free space is about $c=2997*10^8$ mm/s.

The design center frequency of the example embodiment is about $f_0=28.5$ GHz.

The free-space wavelength of light at $f_0$ is about $\lambda_0=c/f_0=10.52$ mm.

The relative dielectric constant of both the printed circuit board substrates and the dielectric rod are both about $\varepsilon_R=3.0$.

- The dielectric is a linear isotropic medium whose permeability equals that of free space.
- Hence, it may be that its only consequence upon EM field solutions is due to its scalar relative permittivity.

The dielectric wavelength in TEM (transverse electromagnetic) mode is $\lambda_D=\lambda_0/\text{sqrt}(\varepsilon_R)=6.073$ mm.

With the exception of its coaxial connectors, the dual-linear antenna essentially is a solid geometry in dielectric materials, plated-through copper vias, and copper foil, and the overall design may be determined by how the boundary conditions imposed by those materials affect the solutions of Maxwell's equations of electromagnetism. The overall goal is the realization of two independent conduits, one transmitting x-polarized EM waves and the other transmitting y-polarized EM waves, each of which is optimized to minimize reflection at its respective coaxial feed connector terminal.

The extents of the PCB 200 are (22.35 mm, 22.35 mm, 4.98 mm) in the x-, y-, and z-directions.

The dielectric rod 110 has a diameter at its base of 6.10 mm, which is very close to the value of p. It tapers linearly to a diameter of 3.10 mm over 25.4 mm in the z-direction, then maintains this diameter for an overall length of 140.97 mm.

In other words, the overall length of the dielectric rod 110 is about 140.97 mm/$\lambda_0$=13.4 TEM wavelengths at $f_0$ in free space, or 140.97 mm/$\lambda_D$=23.2 TEM wavelengths at $f_0$ in the dielectric.

Through its effect of refractive focusing, the dielectric rod 110 of this length can narrow the half-power beamwidth of the overall antenna to about 20 degrees, from what otherwise would be about 70 degrees, the beamwidth of a half-wave dipole antenna.

The dielectric rod 110 is coupled to the cylindrical pedestal 270 milled into the capping dielectric lamina of the PCB.

The pedestal 270 has an overall thickness in the z-direction of 1.4 mm, but just 0.81 mm where the capping dielectric lamina has been milled back to reveal the pedestal.

These equate to 1.4 mm/$\lambda_D$=0.23 TEM wavelengths in the dielectric, and 0.81/$\lambda_D$=0.13 TEM wavelengths in the dielectric, respectively. In other words, the thicknesses are approximately $\lambda_D$/4 and $\lambda_D$/8.

The thickness of the capping dielectric lamina and the height of its pedestal 270 may be chosen empirically to maximize coupling of EM radiation from the deeper layers of the PCB into the dielectric rod. These thicknesses may serve as optical resonance structures, similar in effect to optical coatings upon the surface of an optical lens.

The radiating slots 261, 262, 263, and 264 in the deeper layers of the PCB are centered within the cylindrical pedestal.

Also centered within the cylindrical pedestal 270 is a post 272 via that penetrates all and/or most of the layers of the PCB. The diameter of the post 272 via was determined empirically in order to isolate radiating apertures on opposite sides of it from receiving one another, which may affect the radiation efficiency of the antenna.

In addition, the inventors herein have determined that, in the absence of the post 272, return loss and isolation between cross-polarization may be adversely impacted.

EM simulation determined that the effect of the post 272 via upon electromagnetic performance is significant within the capping dielectric lamina.

In this example, the post 272 is the only through via, i.e., the only via that penetrates the entire PCB.

All other vias in the dual-linear antenna are blinded or buried by the capping dielectric lamina, or by some copper plane layer, or layers.

The post 272 and the radiating apertures are within the cylindrical pedestal 270 of the capping dielectric lamina.

Four blind vias of larger diameter, which serve as mounting holes for the PCB are included, in addition to numerous blind vias of smaller diameter.

Many of the smaller vias are located on a regular rectangular grid. This set is deemed the set of extra blind vias, since they may not play a primary role in guiding electromagnetic from the coaxial feed connectors to the radiating slots, but rather serve to contain within the PCB stray EM fields that have escaped the primary circuits.

The remainder of the smaller vias, while necessarily lying on a regular rectangular grid, play a primary role in guiding EM radiation within the PCB. This set is deemed the set of essential blind vias.

The 1st copper plane is nearly entirely intact, except for the four radiating apertures and two round holes.

The two round holes were found by empirical means to improve overall performance of the dual-linear antenna slightly, but play no primary role in its operation.

The round holes are vestiges of what may be approximated as coaxial waveguide structures buried within the deeper layers of the PCB, from which the center conductor has been discontinued.

These coaxial structures guide EM radiation in TEM mode along the z-axis.

Their diameters are 1.07 mm, or 1.07 mm/$\lambda_D$=0.17 TEM wavelengths in the dielectric, and hence incapable of supporting EM wave modes other than TEM within the effective bandwidth of the dual-linear antenna.

The lowest cutoff frequency for a circular waveguide ($TE_{11}$ mode) of diameter 1.07 mm is fc=1.841/($\pi$*1.07 mm)*c/sqrt($\varepsilon_R$)=94.9 GHZ, which far exceeds the effective bandwidth of the dual-linear antenna.

Each of the radiating apertures belonging to the first pair of radiating apertures has its longer extent in the y-direction, and play a primary role in the operation of the dual-linear antenna.

The first pair of radiating apertures are cross-sections of what may be approximated by rectangular waveguides buried within the deeper layers of the PCB.

These rectangular waveguide structures guide EM radiation in $TE_{10}$ mode along the z-axis.

Each radiating aperture belonging to the first pair of radiating apertures has the approximate extents of 3.610 mm in the y-direction, and 0.250 mm in the x-direction.

In other words, their least extent is in the x-direction, which implies that the EM radiation that they transmit is polarized in the x-direction when operated in $TE_{10}$ mode.

In $TE_{10}$ mode, the cutoff wavelength for a rectangular waveguide of these dimensions is 2*3.610 mm, or 7.220 mm, which corresponds to a cutoff frequency in the dielectric of $f_{C\_TE10}$=c/sqrt($\varepsilon_R$)/7.220 mm=23.97 GHz.

In other words, since the design center frequency $f_0$=28.5 GHz exceeds $f_{C\_TE10}$=23.97 GHz, $TE_{10}$ mode may propagate in a rectangular waveguide of these dimensions.

The cutoff frequency of the next higher propagating mode for this rectangular waveguide is $TE_{20}$, whose cutoff frequency in the dielectric is $f_{C\_TE20}$=2*23.97 GHz=47.94 GHz. Hence, this dual-linear antenna design should operate below the cutoff frequency of $TE_{20}$ in order to avoid dispersion effects due to varying phase velocities among modes.

In other words, $TE_{20}$ and all higher order modes are evanescent in a rectangular waveguide of these dimensions.

The wavelength in these rectangular waveguides, at the design center frequency $f_0$=28.5 GHZ, in $TE_{10}$ mode, along the z-direction, is $\lambda_{WG\_TE10}$=11.23 mm.

Waveguide structures are well known to support phase velocities in excess of the speed of light in a vacuum, c; hence, it is not surprising that $\lambda_{WG\_TE10}$=11.23 mm exceeds c/$f_0$=10.51 mm.

The total extent of these waveguides in the z-direction is 4.17 mm, or 4.17 mm/$\lambda_{WG\_TE10}$=0.371 wavelengths in the waveguide, which is very close to ⅜*$\lambda_{WG\_TE10}$.

The two radiating apertures belonging to the first pair of radiating apertures are separated in the x-direction by 3.56 mm. This equates to 3.56 mm/$\lambda_D$=0.586 wavelengths in the dielectric, or slightly more than ½ wavelength in the dielectric.

This separation between the two radiating apertures, when both apertures are excited identically, creates a minimum in the antenna pattern along the x-axis and the negative x-axis, due to the destructive interference implied by the nearly ½ $\lambda_D$ spacing.

The result is that the antenna pattern of the first pair of radiating apertures has about the same beamwidth about the y-axis as it has about the x-axis.

Each of the apertures is curled at its ends in order to meet minimum-width rules for the copper foil between the aperture and its neighboring apertures.

The second pair of radiating apertures is simply a rotation of the first pair of radiating apertures by 90 degrees about the axis of the tower via.

Every statement about the first pair of radiating apertures applies to the second pair of radiating apertures, except that the second pair of radiating apertures transmits EM radiation that is polarized in the y-direction.

Accordingly, each aperture belonging to the second pair of radiating apertures has its least extent in the y-direction.

There are four signal injection probes, each of which is centered within each of the radiating apertures of the first pair of radiating apertures and the second pair of radiating apertures.

These probes perform broadside signal injection into the rectangular waveguide segments in order to excite the $TE_{10}$ propagation mode within them.

The 2nd copper plane is seen to be identical to the 1st copper plane.

A purpose of the 2nd copper plane is to extend the rectangular waveguides in the negative z-direction.

A dielectric lamina of thickness 0.320 mm in the z-direction separates the 1st copper plane from the 2nd copper plane. The dielectric thickness 0.320 mm equates to 0.320 mm/$\lambda_{WG\_TE10}$=0.028 wavelengths in the rectangular waveguide.

The 3rd copper plane is identical to the 2nd copper plane.

A purpose of the 3rd copper plane is to extend the rectangular waveguides in the negative z-direction.

A dielectric lamina of thickness 0.089 mm in the z-direction separates the 2nd copper plane from the 3rd copper plane. The dielectric thickness 0.089 mm equates to 0.089 mm/$\lambda_{WG\_TE10}$=0.008 wavelengths in the rectangular waveguide.

The 4th copper plane is nearly identical to the 3rd copper plane, except that the diameter of one of the extra holes has increased in diameter from 1.07 mm to 2.22 mm.

The round holes are vestiges of what may be approximated as coaxial waveguide structures buried within the deeper layers of the PCB, from which the center conductor has been discontinued.

Since their diameter has increased from 1.07 mm to 2.22 mm, the cutoff frequency for the circular waveguide decreases to 94.9 GHZ*1.07 mm/2.22 mm=39.95 GHz.

A dielectric lamina of thickness 0.320 mm in the z-direction separates the 3rd copper plane from the 4th copper plane. The dielectric thickness 0.320 mm equates to 0.320 mm/$\lambda_{WG\_TE10}$=0.028 wavelengths in the rectangular waveguide.

The 5th copper plane is identical to the 4th copper plane.

A dielectric lamina of thickness 0.089 mm in the z-direction separates the 4th copper plane from the 5th copper plane. The dielectric thickness 0.089 mm equates to 0.089 mm/$\lambda_{WG\_TE10}$=0.008 wavelengths in the rectangular waveguide.

A dielectric lamina of thickness 0.320 mm in the z-direction separates the 5th copper plane from the 6th copper plane. The dielectric thickness 0.320 mm equates to 0.320 mm/$\lambda_{WG\_TE10}$=0.028 wavelengths in the rectangular waveguide.

The 6th copper plane begins a stripline structure within the PCB by including easements for nearby routed traces. The first of the routed traces lie in the 7th copper plane, immediately below.

Routed traces in the 7th copper plane introduce the broadside feed of EM waves power into the waveguides of the first pair of radiating apertures and the second pair of radiating apertures. Also in the 7th copper layer is a ring hybrid-like structure that drives the second pair of radiating apertures in opposite (180 degree) phasing.

A dielectric lamina of thickness 0.089 mm in the z-direction separates the 6th copper plane from the 7th copper plane. The dielectric thickness 0.089 mm equates to 0.089 mm/$\lambda_{WG\_TE10}$=0.008 wavelengths in the rectangular waveguide.

The broadside feed injection probes driving the rectangular waveguides extend all the way to the far side of the waveguide's broad wall.

Opposite (180 degree) phasing to drive the broadside injection probes is necessary to create a main lobe of the dual-linear antenna's antenna pattern in the positive z-direction because each aperture within a given pair of radiating apertures is drive from a geometrically opposite direction: the positive x-direction and the negative x-direction; and, the positive y-direction and the negative y-direction.

The rectangular waveguides of the radiating apertures are terminated in a backing short-circuit plane in the final copper layer.

The distance, in the z-direction, from the broadside injections probes to the backing short-circuit plane is 2.790 mm, or 2.790 mm/$\lambda_{WG\_TE10}$=0.248 wavelengths in the rectangular waveguide at $f_0$, or almost exactly ¼ wavelengths in the rectangular waveguide at $f_0$.

These quarter-wave transformers transform the backing short-circuit plane into an open circuit at the broadside injection probes, with the result that EM wave power injected by the broadside injections probes undergoes constructive interference in the positive z-direction within the rectangular waveguides, but destructive interference in the negative z-direction.

The ring hybrid-like structure has a mean diameter of 3.08 mm, and a mean circumference of π*3.08 mm=9.676 mm, or 9.676/$\lambda_D$=1.593 wavelengths in the dielectric, or slightly more than 6 quarter wavelengths in the dielectric at $f_0$.

The ring hybrid-like structure is tapped in three positions, at nominally 0 degrees, 60 degrees and 180 degrees, which equates to about 0 quarter wavelengths in the dielectric, 1 quarter wavelength in the dielectric, and 3 quarter wavelengths in the dielectric at $f_0$.

When 0 quarter wavelengths is taken as the input port, the two output ports are separated by 180 degrees in phase, or 2 quarters of a wavelength in the dielectric at $f_0$.

A dielectric lamina of thickness 0.320 mm in the z-direction separates the 7th copper plane from the 8th copper plane. The dielectric thickness 0.320 mm equates to 0.320 mm/$\lambda_{WG\_TE10}$=0.028 wavelengths in the rectangular waveguide.

A dielectric lamina of thickness 0.089 mm in the z-direction separates the 8th copper plane from the 9th copper plane. The dielectric thickness 0.089 mm equates to 0.089 mm/$\lambda_{WG\_TE10}$=0.008 wavelengths in the rectangular waveguide.

A dielectric lamina of thickness 0.320 mm in the z-direction separates the 9th copper plane from the 10th copper plane. The dielectric thickness 0.320 mm equates to 0.320 mm/$\lambda_{WG\_TE10}$=0.028 wavelengths in the rectangular waveguide.

A second ring hybrid-like structure appears in the 10th copper layer. The second ring hybrid-like structure feeds the first pair of radiating apertures in a manner entirely analogous to that performed by the first ring hybrid-like structure to the second pair of radiating apertures.

The second ring hybrid-like structure resides on the 10th copper layer, rather than the 7th, so that its feeds may reach the first pair of radiating apertures without intersecting the feeds to the second pair of radiating apertures.

Hence, the feeds from the second ring hybrid-like structure rise through buried vias to the 7th copper layer, once they have crossed the feeds from the first ring hybrid-like structure, to the first pair of radiating apertures.

A dielectric lamina of thickness 0.089 mm in the z-direction separates the 10th copper plane from the 11th copper plane. The dielectric thickness 0.089 mm equates to 0.089 mm/$\lambda_{WG\_TE10}$=0.008 wavelengths in the rectangular waveguide.

A dielectric lamina of thickness 0.320 mm in the z-direction separates the 11th copper plane from the 12th copper plane. The dielectric thickness 0.320 mm equates to 0.320 mm/$\lambda_{WG\_TE10}$=0.028 wavelengths in the rectangular waveguide.

A dielectric lamina of thickness 0.089 mm in the z-direction separates the 12th copper plane from the 13th copper plane. The dielectric thickness 0.089 mm equates to 0.089 mm/$\lambda_{WG\_TE10}$=0.008 wavelengths in the rectangular waveguide.

A dielectric lamina of thickness 0.320 mm in the z-direction separates the 13th copper plane from the 14th copper plane. The dielectric thickness 0.320 mm equates to 0.320 mm/$\lambda_{WG\_TE10}$=0.028 wavelengths in the rectangular waveguide.

A dielectric lamina of thickness 0.220 mm in the z-direction separates the 14th copper plane from the 15th copper plane. The dielectric thickness 0.220 mm equates to 0.220 mm/$\lambda_{WG\_TE10}$=0.020 wavelengths in the rectangular waveguide.

A dielectric lamina of thickness 0.320 mm in the z-direction separates the 15th copper plane from the 16th copper plane. The dielectric thickness 0.320 mm equates to 0.320 mm/$\lambda_{WG\_TE10}$=0.028 wavelengths in the rectangular waveguide.

A dielectric lamina of thickness 0.220 mm in the z-direction separates the 16th copper plane from the 17th copper plane. The dielectric thickness 0.220 mm equates to 0.220 mm/$\lambda_{WG\_TE10}$=0.020 wavelengths in the rectangular waveguide.

A crescent occluding part of larger round hole slightly extends the ground plane beneath a microstrip trace routed in the 18th copper plane, for better impedance matching.

A dielectric lamina of thickness 0.320 mm in the z-direction separates the 17th copper plane from the 18th copper plane. The dielectric thickness 0.320 mm equates to 0.320 mm/$\lambda_{WG\_TE10}$=0.028 wavelengths in the rectangular waveguide.

The rectangular waveguides terminate in a solid copper plane backing reflector.

Microstrip traces route signals from the coaxial connectors to vias that deliver them to the inner layers of the PCB.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A dual-polarized antenna (100); the dual-polarized antenna (100) comprising:

a. a dielectric rod (110) having a first diameter at a first end (112) and a second diameter at a second end (114); and b. a printed circuit board (PCB) assembly (200) having a front face (202) and a back face (204), the PCB assembly (200) comprising:

i. a stacked plurality of planar dielectric layers (210);

ii. a plurality of planar conductive layers (220), stacked between the dielectric layers (210);

iii. a plurality of radiating apertures (260) in the conductive layers (220), wherein the radiating apertures (260) in neighboring conductive layers (220) are aligned to form a first parallel pair of slots (265) and a second parallel pair of slots (266), wherein the first pair of slots (265) comprises a first slot (261) and a second slot (262), the second pair of slots (266) comprises a third slot (263) and a fourth slot (264), and wherein the first pair of slots (265) and the second pair of slots (266) are perpendicular to each other;

iv. a dielectric pedestal (270) extending from the front face of the PCB assembly, wherein the first pair of slots (265) and the second pair of slots (266) are arranged to form a quasi-rectangular shape which is concentric with the pedestal (270); and v. a central conductive post (272) which passes through the pedestal (270) to the back face (204) of the PCB assembly (200) such that it is surrounded by the four slots;

wherein the first end (112) of the dielectric rod (110) is affixed to the dielectric pedestal (270) such that the dielectric rod (110) and the dielectric pedestal (270) are concentric.

2. The antenna of claim 1, further comprising i. a first radio-frequency (RF) connector (230) and a second RF connector (232), each affixed to the back face (204) of the PCB assembly (200);

ii. a first splitter (240) patterned in one of the conductive layers (220), the first splitter (240) comprising a first port (241), a second port (242), and a third port (243), wherein the first port (241) is connected with the first RF connector (230) via a first conductive feed (251);

iii. a second splitter (245) patterned in one of the conductive layers (220), the second splitter (245) comprising a first port (246), a second port (247), and a third port (248), wherein the first port (246) is connected with the second RF connector (232) via a second conductive feed (252);

iv. a first monopole probe (271) patterned in one of the conductive layers (220) such that it bisects one of the radiating apertures (260) of the first slot (261), wherein the first monopole probe (271) is connected to the second port (242) of the first splitter (240) via a third conductive feed (253);

v. a second monopole probe (272) patterned in one of the conductive layers (220) such that it bisects one of the radiating apertures (260) of the second slot (262), wherein the second monopole probe (272) is connected to the third port (243) of the first splitter (240) via a fourth conductive feed (254);

vi. a third monopole probe (273) patterned in one of the conductive layers (220) such that it bisects one of the radiating apertures (260) of the third slot (263), wherein the third monopole probe (273) is connected to the second port (247) of the first splitter (245) via a fifth conductive feed (255);

vii. a fourth monopole probe (274) patterned in one of the conductive layers (220) such that it bisects one of the radiating apertures (260) of the fourth slot (264), wherein the fourth monopole probe (274) is connected to the third port (248) of the first splitter (245) via a sixth conductive feed (256).

3. The antenna of claim 2, wherein the first RF splitter (240) and the second RF splitter (245) are located in different conductive layers (220); wherein the feeds are formed from traces and vias which are isolated from the conductive layers (220) via easement gaps; and wherein the traces comprise striplines.

4. The antenna of claim 1, additionally comprising a plurality of conformal conductive posts (274) and grid conductive posts (276) passing at least partially through the PCB assembly (200) so as to shield the slots and ground the conductive layers (220); additionally comprising a plurality of mechanical mounting holes (278) passing through the PCB assembly (200) so as to allow for mounting of the PCB assembly (200).

5. The antenna of claim 1, wherein the first pair of slots (265) corresponds to signals polarized in an x-direction, and the second pair of slots (266) corresponds to signals polarized in a y-direction.

6. The antenna of claim 1, wherein the antenna is configured to emit a circularly polarized signal using both the first pair of slots (265) and the second pair of slots (266).

7. The antenna of claim 1, wherein the central conductive post (272) extends a distance past the four slots; wherein the distance is between about ⅛ and ½ of a wavelength of the antenna; wherein the wavelength is about 6 mm.

8. The antenna of claim 7, wherein the first diameter of the dielectric rod is about equal to the wavelength of the antenna.

9. The antenna of claim 7, wherein each of the pairs of slots is spaced about ½ of the wavelength apart.

10. The antenna of claim 7, wherein each of the slots is has a length of about ½ of the wavelength.

11. The antenna of claim 1, wherein the slots of each pair are fed from opposite directions, with a signal that is 180-degrees out of phase.

12. The antenna of claim 1, wherein the central conductive post (272) provides isolation between the four slots.

13. The antenna of claim 1, comprising multiple central conductive posts (272) arranged in a pattern surrounded by the four slots.

14. The antenna of claim 1, wherein the two conductive feeds from each splitter to the corresponding pair of monopole probes have about equal length.

15. The antenna of claim 1, wherein the two conductive feeds from each splitter to the corresponding pair of monopole probes have different lengths so as to provide signals which are 180-degrees out of phase from each other.

16. The antenna of claim 1, wherein each of the radiating apertures are curled at one or both of the ends such that they are separated from neighboring radiating apertures in the same layer.

17. The antenna of claim 1, wherein a bottom conductive layer acts as a backing short-circuit plane; wherein a distance from the monopole probes to the backing short-circuit plane is about ¼ of a wavelength of the antenna.

18. The antenna of claim 1, wherein the splitters are ring hybrid or rat race splitters; wherein each splitter has its first port at 0 degrees, its second port at 60 degrees, and its third port at 180 degrees; wherein the splitters are 180-degree splitters.

19. The antenna of claim 1, wherein the dielectric pedestal is circular, and has a diameter about equal to the first diameter of the dielectric rod.

20. The antenna of claim 1, wherein the central conductive post extends into the dielectric rod.

21. The antenna of claim 1, wherein the conductive posts are plated through-holes or vias.

22. The antenna of claim 1, comprising a number of conductive layers from 4 to 100.

23. The antenna of claim 1, wherein a center frequency of the antenna is between about 500 MHz and 100 GHz.

24. The antenna of claim 1, wherein a center frequency of the antenna is about 28 GHz.

25. The antenna of claim 1, wherein each pair of slots has a different center frequency.

26. The antenna of claim 1, wherein each pair of slots has a same center frequency.

* * * * *